(12) United States Patent
Ishii et al.

(10) Patent No.: US 6,827,268 B2
(45) Date of Patent: Dec. 7, 2004

(54) IMAGING DEVICE

(75) Inventors: Mitsuharu Ishii, Kawasaki (JP); Toshitaka Aoki, Kawasaki (JP); Isao Iwaguchi, Kawasaki (JP); Hiroaki Kawai, Kawasaki (JP); Kozo Yamazaki, Kawasaki (JP); Mitsuo Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 187 days.

(21) Appl. No.: 09/970,981

(22) Filed: Oct. 5, 2001

(65) Prior Publication Data

US 2002/0139857 A1 Oct. 3, 2002

(30) Foreign Application Priority Data

Jan. 30, 2001 (JP) ........................................ 2001-021682

(51) Int. Cl.$^7$ ................................................ G06K 19/06
(52) U.S. Cl. ............................ 235/462.25; 235/462.08
(58) Field of Search ..................... 235/462.25, 462.08, 235/462.09, 462.1, 462.11, 462.12, 462.41; 396/96, 65

(56) References Cited

U.S. PATENT DOCUMENTS 4,044,227 A * 8/1977 Holm et al. ................. 235/437
4,951,140 A * 8/1990 Ueno et al. ............... 348/413.1
5,569,905 A * 10/1996 Ohkawa et al. ............. 250/205
5,659,811 A * 8/1997 Ishiguro ....................... 396/95
6,315,201 B1 * 11/2001 Reichenbach et al. . 235/462.08

FOREIGN PATENT DOCUMENTS

JP 6-348879 12/1994
JP 8-212280 8/1996

* cited by examiner

*Primary Examiner*—Diane I. Lee
(74) *Attorney, Agent, or Firm*—Staas & Halsey LLP

(57) ABSTRACT

A still image of a moving object is restored from portions including the object in an image by using a movement distance of the object during an exposure time and the difference value between output values of adjacent pixels, the movement distance being calculated as a number of pixels. Therefore, especially in cases where a moving bar code is imaged, even if the image of the bar code is blurred as a result of the movement of the bar code during imaging, a still image of the bar code in which the outlines of the black portions and white portions of the bar code are clear can be obtained. Accordingly, bar code information can be read out from the imaged bar code.

9 Claims, 14 Drawing Sheets

Image of stationary bar code

↓ Image of bar code moved 9 pixels
without restoration process

↓ Image of bar code moved 9 pixels
with restoration process

IMAGING DEVICE

BACKGROUND OF THE INVENTION

1. Field of the Invention

The present invention relates to an imaging device which images a moving object using an imaging element such as a CCD, and restores a still image of the object from a motion-blurred image of the object, and more particularly relates to a bar code scanner which reads bar codes.

2. Description of the Related Art

For example, laser scanners are known as bar code scanners. A laser scanner reads a bar code by scanning the bar code in one direction (e.g., by moving the bar code in one direction with respect to a fixed bar code scanner), and detecting the widths of the black and white bars in the bar code according to the intensity of the reflected light.

However, in cases where a bar code is moved in one direction relative to a bar code scanner as described above, a one-dimensional bar code can be read, but a two-dimensional bar code that has information in the form of a planar surface cannot be read.

A conceivable method of reading a two-dimensional bar code is a method in which the two-dimensional bar code is imaged using (for example) an imaging device which has imaging elements that are lined up in rows in two dimensions. However, in cases where a bar code is imaged by an imaging device, it is necessary to image the bar code in a stationary or close-to-stationary state. The reason for this is that since the individual imaging elements contained in the imaging device detect the quantity of light that is input during the shutter-opening time (exposure time), an amount of motion blurring that is equal to movement speed/shutter-opening time is generated if the bar code is moving, so that a clear image cannot be obtained. Specifically, if a clear image cannot be obtained, the outlines of the black and white bars of the bar code become indistinct, so that the widths of the black and white bars of the bar code cannot be detected. As a result, the bar code cannot be read. In order to suppress such motion blurring, it is necessary to make the shutter-opening time infinitely short, and to convert the external environment into an environment which has a quantity of light that matches the shutter-opening time. However, this is impractical.

SUMMARY OF THE INVENTION

Accordingly, an object of the present invention is to provide an imaging device which can image a moving bar code, and which read the bar code from this image.

A further object of the present invention is to provide an imaging device which can image a moving object and restore a still image of the object from a motion-blurred image of the object.

For achieving the above object, an imaging device of the present invention restores a still image of a moving object from portions including the object in an image by using a movement distance of the object during an exposure time and the difference value between output values of adjacent pixels, the movement distance being calculated as a number of pixels.

Preferably, an imaging device of the present invention, for imaging an object with a specified exposure time at specified time intervals using a plurality of imaging elements arranged in two dimensions, comprises:

a calculation unit for calculating, as the number of imaging elements, the movement distance traveled by the object during the exposure time within an image corresponding to the output values of the plurality of imaging elements; and a restoration unit for restoring a still image of the object from portions including the object within said image by using the movement distance and the difference values between the output values of adjacent imaging elements.

More specifically, the imaging device of the present invention further comprises:

a first memory for storing a first image; and a second memory for storing a second image that is imaged following the first image;

wherein said calculation unit calculates the movement distance of the object during said time interval on the basis of the difference between the position of the portions including the object within the first image and the position of the portions including the object within the second image, and further calculates the movement distance of the object during said exposure time within the first image or second image on the basis of the ratio of said exposure time to said time interval.

DESCRIPTION OF THE PREFERRED EMBODIMENTS

An embodiment of the present invention will be described below. However, the technical scope of the present invention is not limited to this embodiment.

Figure 1:
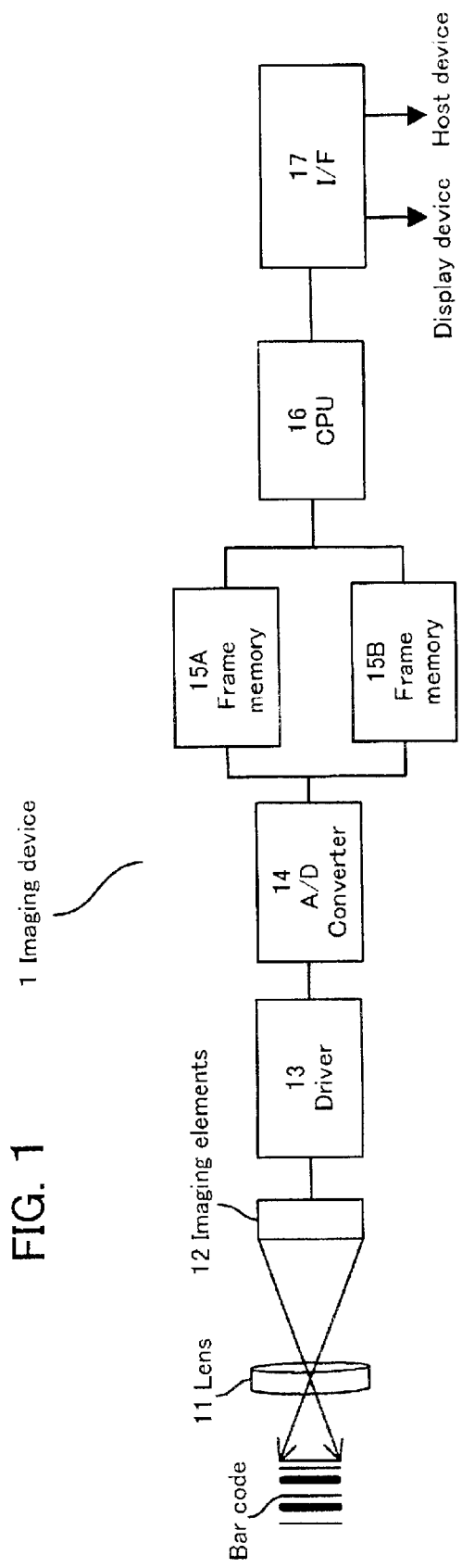
FIG. 1 is a diagram which shows an example of the construction of the imaging device in an embodiment of the present invention.

FIG. 1 is a diagram which shows an example of the construction of the imaging device in an embodiment of the present invention. The imaging device of this embodiment will be described using a bar code scanner that scans an imaged bar code as an example. In FIG. 1, the imaging device 1 has a lens 11 and a plurality of imaging elements (e.g., CCD elements or CMOS elements, etc.) 12 that are disposed in two dimensions; this imaging device 1 images a moving bar code. A driver 13 drives the imaging elements, and image signals from the imaging elements are sent to an A/D converter 14. The A/D converter 14 converts the analog image signals into digital image data, and stores this data in frame memories 15. The imaging device of the present embodiment has two frame memories 15A and 15B. Image data that is imaged in a specified imaging time interval (e.g., every 1/60 of a second) is alternately stored in the frame memories 15A and 15B. A CPU (central processing unit)16 which constitutes an image processing device reads out image data from the frame memories 15A and 15B, and performs the bar code restoration processing that is characteristic of the present invention. Specifically, portions containing a bar code are extracted from the image data that has been imaged, and the bar code is restored from the bar code portions that have been blurred as a result of motion-blurring. When the bar code is restored, the CPU 16 reads out the bar code information and transmits the bar code information to a host device via a specified interface 17. Furthermore, in cases where the CPU 16 has restored the bar code in a normal manner, a "restoration completed" display is performed by a specified display device, while in cases where the bar code could not be restored, an error display is performed.

Figure 2:
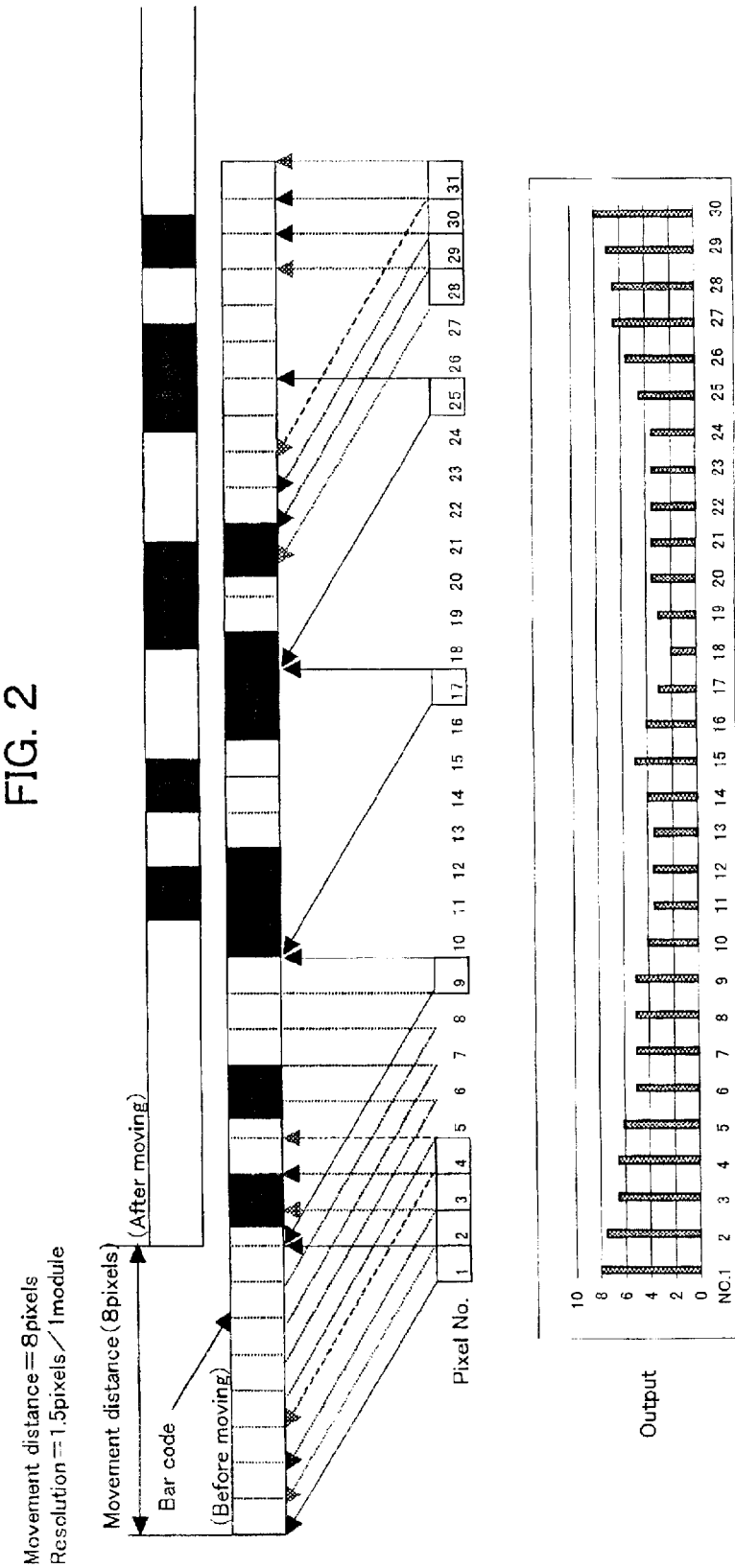
FIG. 2 is a diagram which illustrates the output values of the respective imaging elements that image a moving bar code.

First, the principle of the present invention will be described with reference to FIGS. 2 and 3. FIG. 2 is a diagram which illustrates the output values of the respective imaging elements that image the moving bar code. As an example, FIG. 2 illustrates in model form the output values of the respective imaging elements (hereafter referred to as "pixels") in a case where a moving one-dimensional bar code is imaged by a plurality of imaging elements (e.g., CCDs) lined up in a single line. Furthermore, in FIG. 2, numbers are assigned to the respective pixels, the movement distance is set at 8 pixels in terms of the number of pixels, and the resolution is taken to be 1.5 pixels/module. One module is the minimum width of black bars or white bars in the bar code.

During the period extending from the initiation of imaging to the completion of imaging (during the shutter-opening time), the bar code moves toward the right in the figure by an amount equal to 8 pixels. In this case, as is shown in the figures, the black portions of the bar code do not enter the imaging region of pixel No. 1; accordingly, with respect to pixel No. 1, all of the portions that pass through are white portions. In the present embodiment, it is necessary to determine in advance the output values of pixels corresponding to regions in which the entire imaging region is white. This is done in order to determine a reference value for white.

FIG. 2 shows a graph of the output values corresponding to the respective numbered pixels. For example, the output value of pixel No. 1 is "8". Since the movement distance of the bar code in which case is 8 pixels, the output value for pixel No. 1, obtained by dividing the output value by the movement distance, is "1". Specifically, the output value (reference value) for white for one pixel is "1". Furthermore, the output value for black for one pixel is "0 (zero)".

Next, a black portion with a width of 0.5 pixels is included in the imaging region of pixel No. 2, which is adjacent to pixel No. 1. Specifically, since the white portion detected by pixel No. 2 has a width of 7.5 pixels, the output of pixel No. 2 is "7.5".

Furthermore, since a black portion with a width of 1.5 pixels is included in the imaging region of pixel No. 3, the output value of pixel No. 3 is "6.5". Moreover, since a black portion with a width of 1.5 pixels is also included in the imaging region of pixel No. 4, the output value of pixel No. 4, is also "6.5". Similarly, the pixels from pixel No. 5 on have output values that correspond to the pixel widths in which black or white portions are included.

Figure 3:
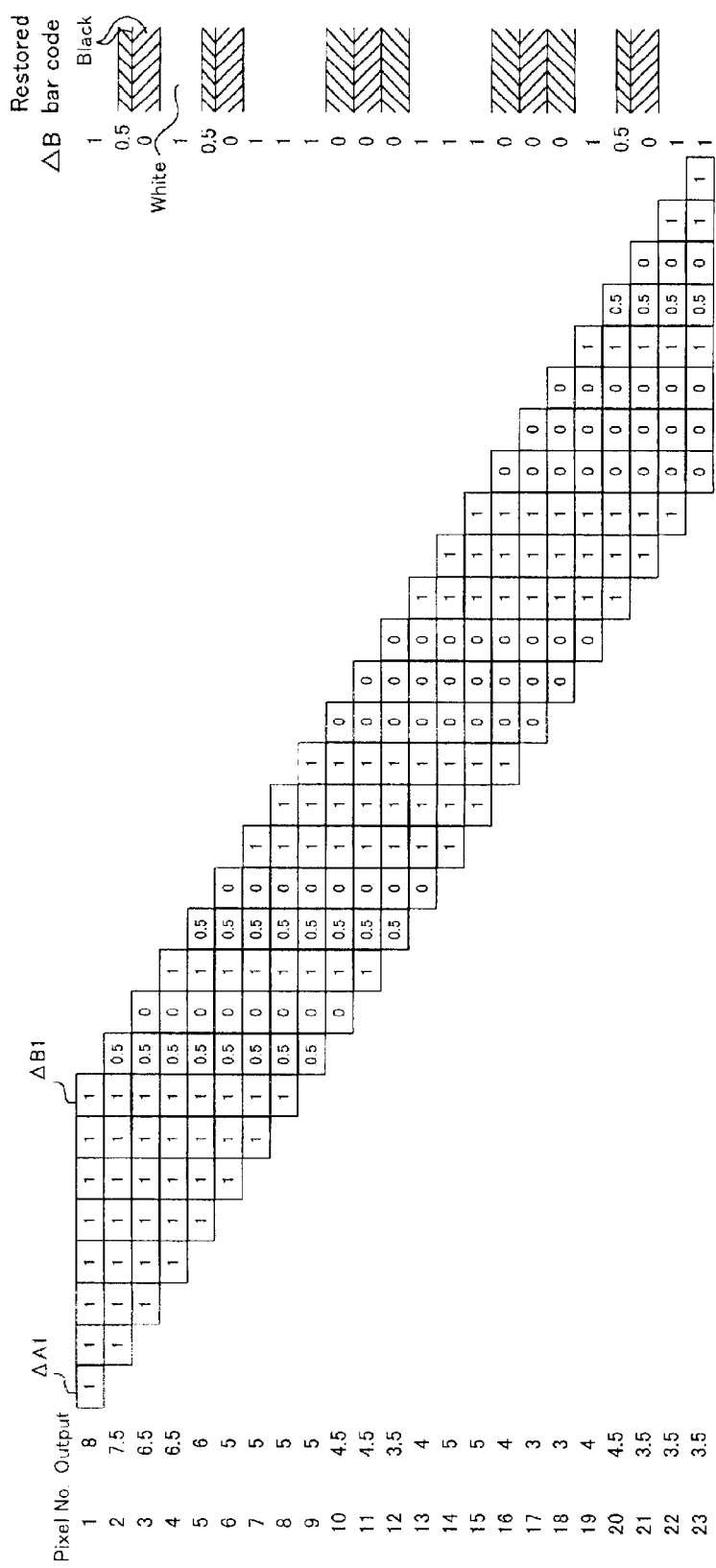
FIG. 3 is a diagram which illustrates the method used to restore the bar code from the output values of the respective pixels.

FIG. 3 is a diagram which illustrates the method used to restore the bar code from the output values of the respective pixels. In FIG. 3, the output value $\Delta A$ corresponding to the initial one-pixel width portion in the output value of each pixel, and the output value $\Delta B$ corresponding to the final one-pixel width portion, are considered.

First, as is shown in FIG. 2, pixel No. 1 images all white portions, and since the output value is the maximum value of "8" for the movement of the bar code by an amount equal to the width of 8 pixels, the output value $\Delta A1$ of the initial one-pixel width portion (hereafter referred to as the "first pixel width") is "1", and the output value $\Delta B1$ of the final one-pixel width portion (hereafter referred to as the "eighth pixel width") is "1". Furthermore, the output values of the respective one-pixel width portions in between (second pixel width through seventh pixel width) may also be viewed as "1".

Then, since the imaging region of pixel No. 2 is shifted from the imaging region of pixel No. 1 by an amount equal to the width of one pixel, the first seven pixels within the imaging region of pixel No. 2 (from the first pixel width to the seventh pixel width) form a common portion with the second pixel width through eighth pixel width of the imaging region of pixel No. 1. since the output values of the respective one-pixel width portions of the imaging region of pixel No. 1 are "1", the output values of the respective one-pixel width portions of this common portion are also "1". Specifically, the output value $\Delta A2$ of the initial one-pixel width portion (first pixel width portion) of pixel No. 2 is "1". Meanwhile, the difference between the overall output value of pixel No. 1 and the overall output value of pixel No. 2 is "8"-"7.5"="0.5", and this difference can be determined as the output value of the output value $\Delta B2$ of the final one-pixel width portion (eighth pixel width portion) constituting the imaging region of pixel No. 2 that does not overlap with the imaging region of pixel No. 1.

Next, since the imaging region of pixel No. 3 is shifted from the imaging region of pixel No. 2 by an amount equal to the width of one pixel, the region extending from the first pixel width portion through the seventh pixel width portion within the imaging region of pixel No. 3 forms a common portion with the second pixel width portion through eighth pixel width portion of the imaging region of pixel No. 2. The output value of this common portion is "6.5", and since the first pixel width portion of pixel No. 3 is the same as the third pixel width portion of pixel No. 1, the output value $\Delta A3$ of this first pixel width portion is "1". Meanwhile, the difference between the overall output value of pixel No. 2 and the overall output value of pixel No. 3 is "6.5"-"6.5"= "0", and this difference can be determined as the output value of the output value $\Delta B3$ of the final one-pixel width portion (eighth pixel width portion) of pixel No. 3 that is not shared with the imaging region of pixel No. 2. Specifically, the output value $\Delta B3$ of the eighth pixel width portion of pixel No. 3 is "0".

The respective output values ΔA and ΔB of the one-pixel width portions at both ends (i.e., the first pixel width portions and eighth pixel width portions) of pixels No. 4, No. 5, . . . , No. 7 can be determined in the same manner.

Furthermore, for pixels beyond pixel No. 8, the output values ΔA and ΔB can be determined by the formula shown below. Specifically, ΔAx and ΔBx for pixel No. x are respective expressed as follows:

$$\Delta Ax = \Delta Bx - 7 \quad (1)$$

$$\Delta Bx = \text{overall output value of pixel No. } x-(\text{overall output value of pixel No. } x-1-\Delta Ax-1) = \Delta Ax-1-(\text{overall output value of pixel No. } x-1-\text{overall output value of pixel No. } x) \quad (2)$$

Furthermore, the abovementioned Equation (2) can also be applied to the abovementioned pixels No. 2 through No. 7.

The output values ΔB of the respective pixels are values that are obtained by subtracting the output values of the imaging region portions that are shared with the preceding pixels from the overall output values of the respective pixels. Specifically, since the output value that is common to a plurality of pixels included by the movement of the bar code is excluded from the overall output value of each pixel, the output values ΔB of the respective pixels correspond to the output values of the respective pixels in a case where the bar code is imaged in a stationary state. Thus, the bar code can be restored by determining the output values ΔB of the respective pixels.

Table 1 shows the overall output values for the respective pixels, the differences between these values and the overall output values of the preceding pixels, and the values of ΔA and ΔB.

TABLE 1

| Pixel No. | Output value | Difference value | ΔA | ΔB |
|---|---|---|---|---|
| 1 | 8 |  | 1 | 1 |
| 2 | 7.5 | 0.5 | 1 | 0.5 |
| 3 | 6.5 | 1 | 1 | 0 |
| 4 | 6.5 | 0 | 1 | 1 |
| 5 | 6 | 0.5 | 1 | 0.5 |
| 6 | 5 | 1 | 1 | 0 |
| 7 | 5 | 0 | 1 | 1 |
| 8 | 5 | 0 | 1 | 1 |
| 9 | 5 | 0 | 0.5 | 1 |
| 10 | 4.5 | 0.5 | 0 | 0 |
| 11 | 4.5 | 0 | 1 | 0 |
| 12 | 3.5 | 1 | 0.5 | 0 |
| 13 | 4 | −0.5 | 0 | 1 |
| 14 | 5 | −1 | 1 | 1 |
| 15 | 5 | 0 | 1 | 1 |
| 16 | 4 | 1 | 1 | 0 |
| 17 | 3 | 1 | 0 | 0 |
| 18 | 3 | 0 | 0 | 0 |
| 19 | 4 | −1 | 0 | 1 |
| 20 | 4.5 | −0.5 | 1 | 0.5 |
| 21 | 3.5 | 1 | 1 | 0 |
| 22 | 3.5 | 0 | 1 | 1 |
| 23 | 3.5 | 0 | 0 | 1 |
| 24 | 4.5 | −1 | 0 | 1 |
| 25 | 5.5 | −1 | 0 | 1 |
| 26 | 6.5 | −1 | 1 | 1 |
| 27 | 6.5 | 0 | 0.5 | 1 |
| 28 | 7 | −0.5 | 0 | 1 |
| 29 | 8 | −1 | 1 | 1 |
| 30 | 8 | 0 | 1 | 1 |

In Table 1, ΔB="1" indicates that the entire width of one pixel is a white portion, ΔB="0" indicates that the entire width of one pixel is a black portion, and ΔB="0.5" indicates that half of the pixel width is a black portion.

Accordingly, from Table 1, as is shown in FIG. 2 or FIG. 3, the constitution of the imaged bar code is restored in order as a single module of black (corresponding to ΔB of pixels No. 2 and No. 3), a single module of white (corresponding to ΔB of pixels No. 4, and No. 5), a single module of black (corresponding to ΔB of pixels No. 5 and No. 6), two modules of white (corresponding to ΔB of pixels No. 7, No. 8 and No. 9), two modules of black (corresponding to ΔB of pixels No. 10, No. 11 and No. 12), two modules of white (corresponding to ΔB of pixels No. 13, No. 14 and No. 15), two modules of black (corresponding to ΔB of pixels No. 16, No. 17 and No. 18), one module of white (corresponding to ΔB of pixels No. 19 and No. 20), and one module of black (corresponding to ΔB of pixels No. 20 and No. 21).

Figure 4:
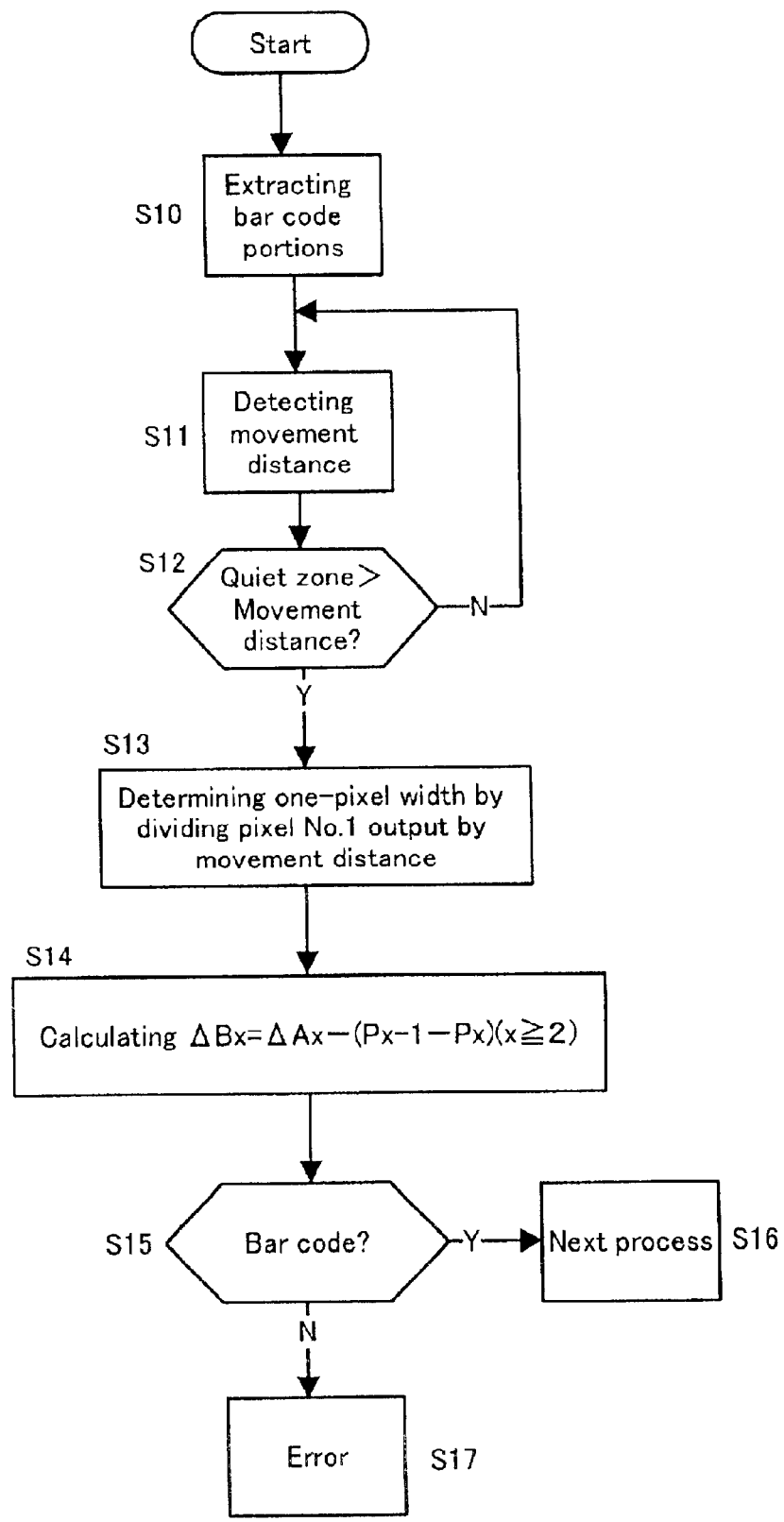
FIG. 4 is a flow chart of the bar code restoration processing in an embodiment of the present invention.

FIG. 4 is a flow chart of the bar code restoration processing in an embodiment of the present invention. In FIG. 4, the portions containing a bar code (bar code portions) are first extracted by a specified method from the image data stored in the frame memories 15A and 15B (S10). Here, the method used to extract the bar code portions will be briefly described.

Figures 5A, 5B, 5C:
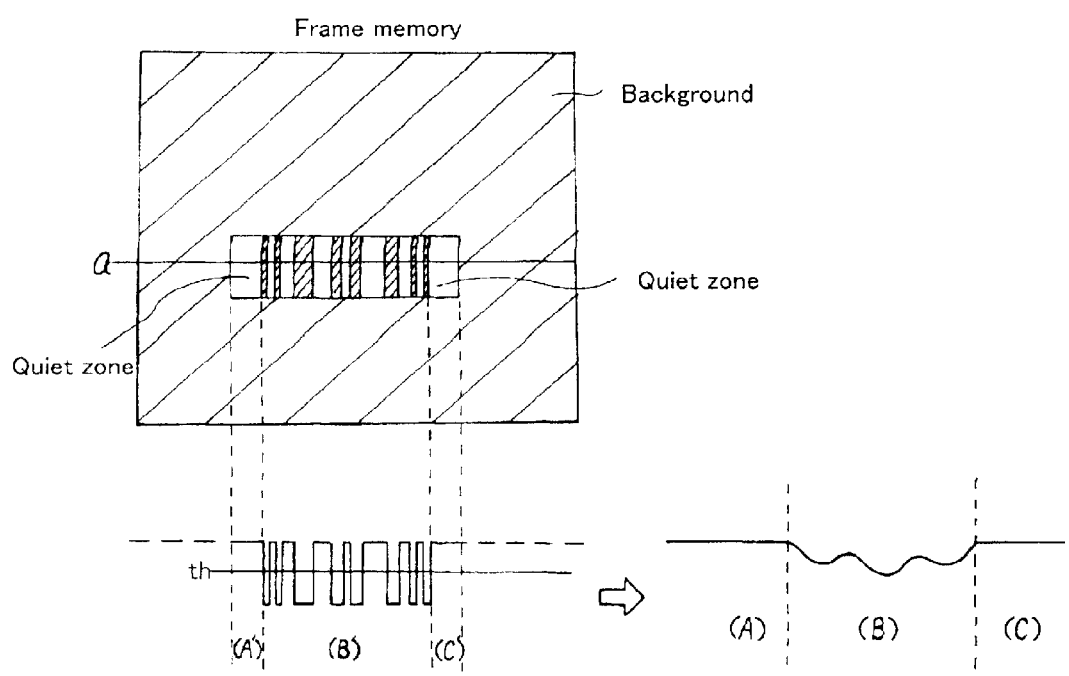
FIGS. 5A, 5B and 5C are diagrams which illustrate the method used to extract the bar code portions.

FIGS. 5A, 5B and 5C are diagrams which illustrate the method used to extract the bar code portions. For example, in a case where the imaging elements image a stationary bar code as shown in FIG. 5A, the outlines of the black and white bars of the bar code are clear; accordingly, as is shown in FIG. 5B, the output waveform of the bar code portions in line a is ideally a steep waveform that matches the widths of the black and white bars. Consequently, in order to extract the bar code portions from a still image, it is sufficient to find an output waveform that corresponds to the pattern of the specified bar code. For example, since quiet zones (white portions) of a specified width are disposed before and after the black and white pattern in a bar code, the bar code portions can be extracted by searching for a pattern with (A') an output value (e.g., a value equal to or greater than a specified threshold value) that corresponds to a white portion with a fixed width or greater (i.e., the quiet zone on the front side), (B') a portion in which output values corresponding to white portions and output values corresponding to black portions (e.g., values that are less than a specified threshold value) are alternately output over a specified width, and (C') an output value that corresponds to a white portion with a fixed width or greater (i.e., the quiet zone on the back side). Furthermore, by using this method, the bar code can be extracted, and the bar code information can be read.

On the other hand, in a case where the bar code moves during the shutter-opening time (exposure time), imaging is performed with the outlines of the black and white bars of the bar code blurred as a result of motion blurring. In this case, in the output waveform of the bar code portions in line a, as is shown in FIG. 5C, the shape of the recessed and projecting waveform corresponding to the alternating black portions and white portions is indistinct compared to that of the waveform of a still image. Accordingly, in cases where bar code portions are to be extracted from an image that suffers from motion blurring, the bar code portions can be extracted by searching for a pattern in which (A) there is a continuing output value corresponding to a white portion which has a fixed width or greater, (B) the output value decreases at a variation rate within a specified range, then an increase and decrease (recessed and projecting portions of the waveform)in the output value is repeated a number of times with a value that is smaller than the output value corresponding to a white portion over a specified width, and the output value rises at a variation rate within a specified range;

(C) there is then a continuing output value corresponding to a white portion which has a fixed width or greater.

Specifically, in order to find portions corresponding to alternating white portions and black portions, a judgement may be made on the basis of the pattern of variation of the output values rather than on the basis of a comparison of the output values with a threshold value.

Figure 6:
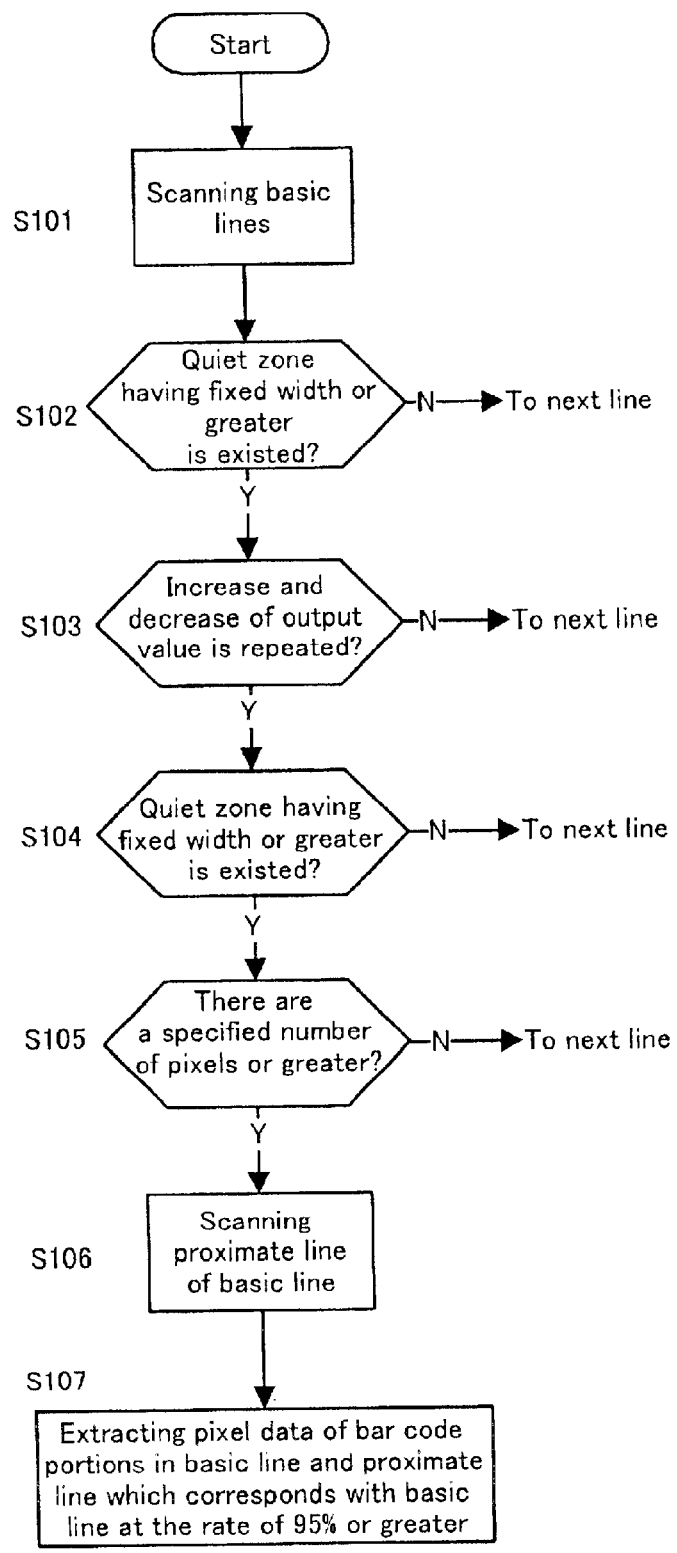
FIG. 6 is a flow chart of the extraction processing of the bar code portions.

FIG. 6 is a flow chart of the extraction processing of the bar code portions. In FIG. 6, lines in the horizontal direction (X direction), vertical direction (Y direction) and direction of a specified angle (e.g., ±45 degrees) in the frame memory 15A or 15B are first scanned at an interval of a specified number of pixels (S101). The lines scanned in step S101 are called "basic lines".

Figure 7:
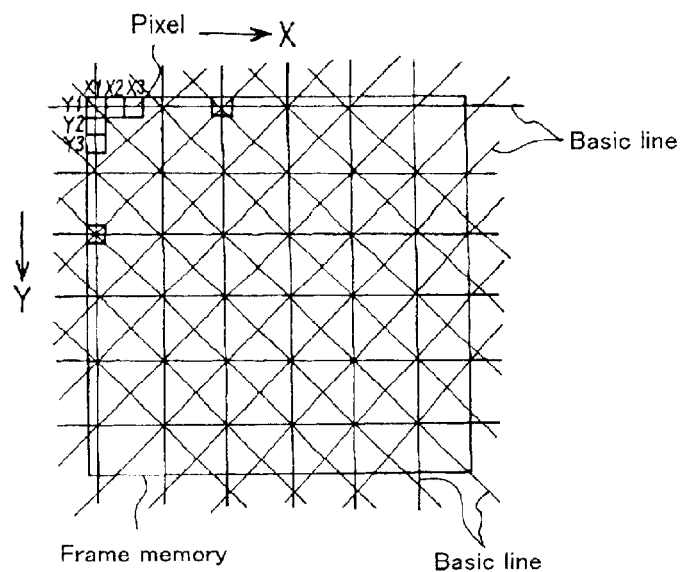
FIG. 7 is a diagram which shows an example of the basic lines.

FIG. 7 is a diagram which shows an example of basic lines. For example, the basic lines are set at a spacing of a specified number of pixels as lines oriented in the horizontal direction (X direction), lines oriented in the vertical direction (Y direction) and lines oriented in the direction of a specified angle (e.g., ±45 degrees) in the frame memories 15. The reason that the basic lines are set in a plurality of directions is that the bar code is not always imaged in one direction; accordingly, these basic lines are set in a plurality of directions so that a bar code imaged in any direction can be detected. The abovementioned specified angle is not limited to 45 degrees; furthermore, a plurality of angles may be set.

In a case where the condition of the abovementioned (A) is satisfied (S102), the condition of the abovementioned (B) is satisfied (S103), the condition of the abovementioned (C) is satisfied (S104) and the total number of pixels satisfying the conditions of the abovementioned (A), (B) and (C) is equal to or greater than a specified number of pixels (S105) in the scanning of a given basic line, lines (proximate lines) in a range of 5 to 10 pixels above and below are scanned in the same direction as the basic line (S106). Furthermore, in cases where there are lines that show a correspondence rate of 95% or greater with the basic line (or that satisfy the conditions of the abovementioned (A), (B) and (C)), the portions of the image data on the basic line that satisfy the conditions of the abovementioned (A), (B) and (C), and the image data of the proximate lines that correspond to these portions, are extracted as the bar code portions (S107). In cases where the respective conditions are not satisfied in the abovementioned steps S102 through S106, the next basic line is scanned, and the abovementioned processing is repeated.

By using such extraction processing, it is possible to extract image data corresponding to the motion-blurred bar code portions from the overall image data that is acquired.

Figure 8:
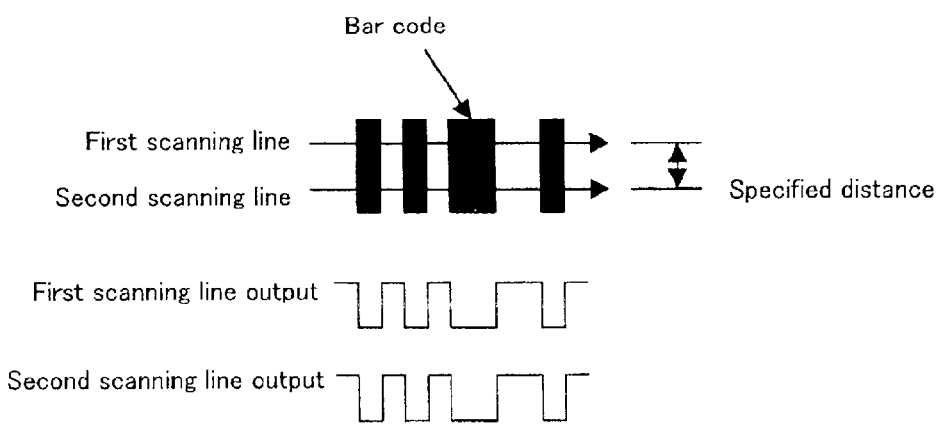
FIG. 8 is a diagram which illustrates the extraction of the bar code portions.

FIG. 8 is a diagram which illustrates the extraction of the bar code portions. As is shown in FIG. 8, if the output values of a first scanning line and a second scanning line that are oriented in the same direction and separated by a specified distance are substantially the same, the area around these portions can be extracted as bar code portions.

Figure 9:
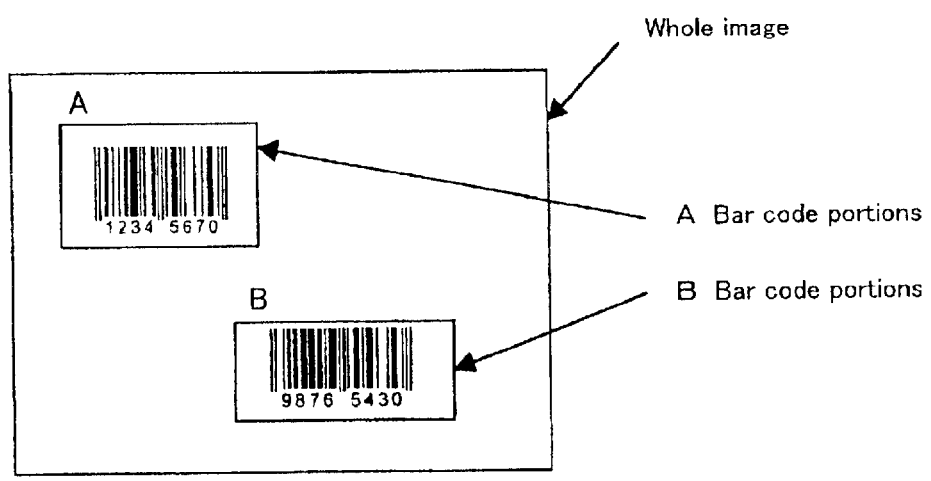
FIG. 9 is an example of an image in which a plurality of bar code portions are present.

FIG. 9 shows an example of an image in which a plurality of bar code portions are present. As is shown in FIG. 9, in cases where a plurality of bar code portions are present, the respective bar code portions (bar code restoration regions A and B in the figure) are extracted by the abovementioned processing, and respective still images are restored.

Returning to FIG. 4, once the bar code portions have been extracted, the movement distance of the bar code is detected (S11). The movement distance is the distance traveled by the bar code during the exposure time of the respective pixels, and is determined as a number of pixels.

Figure 10A:
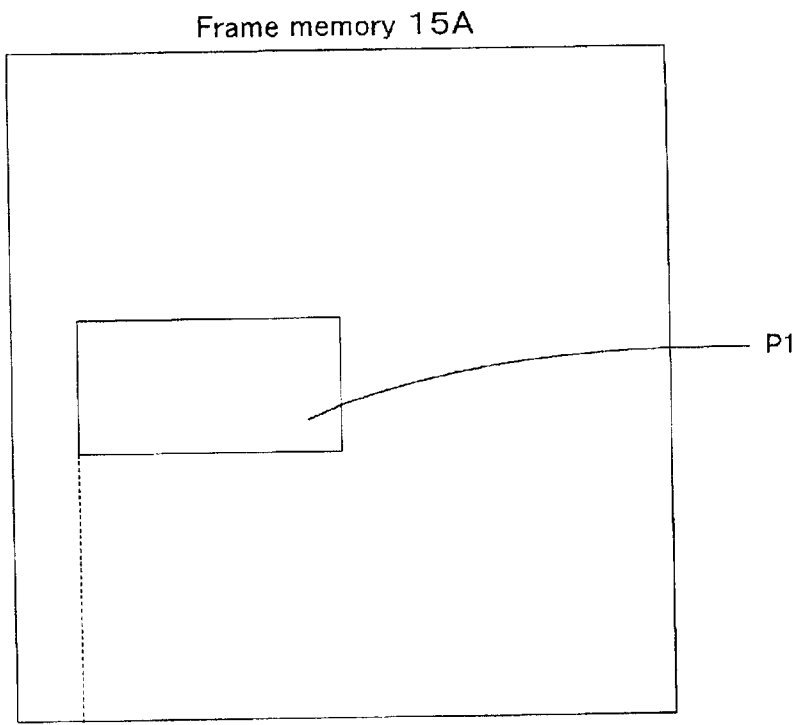
FIGS. 10A and 10B are diagrams which illustrate the movement distance detection method.
Figure 10B:
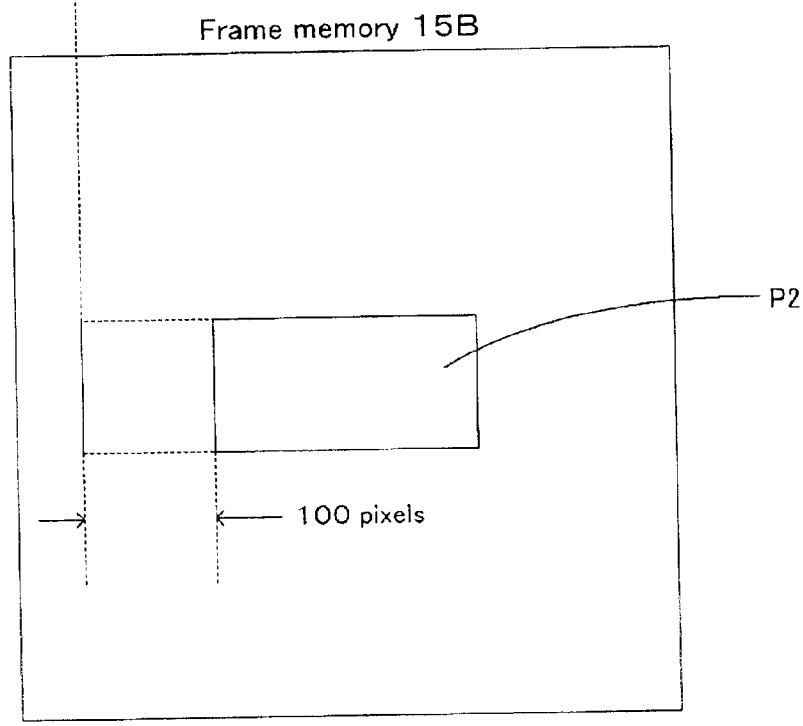

FIGS. 10A and 10B are diagrams which illustrate the movement distance detection method. As is shown in FIG. 1, image data imaged during specified imaging time intervals (e.g., 1/60 of a second) is alternately stored in two frame memories 15A and 15B. FIGS. 10A and 10B respectively show examples of the image data stored in the frame memories 15A and 15B. Image areas P1 and P2 corresponding to bar code portions are respectively extracted from the image data. Furthermore, in cases where the bar code moves in the horizontal direction with respect to the imaging elements, the positions of the image areas P1 and P2 in the frame memories are separated by the movement distance of the bar code portions during the imaging time interval.

In the present embodiment, the movement distance of the image areas P1 and P2 corresponding to the imaging time interval is calculated as the movement distance during the exposure time.

Figure 11:
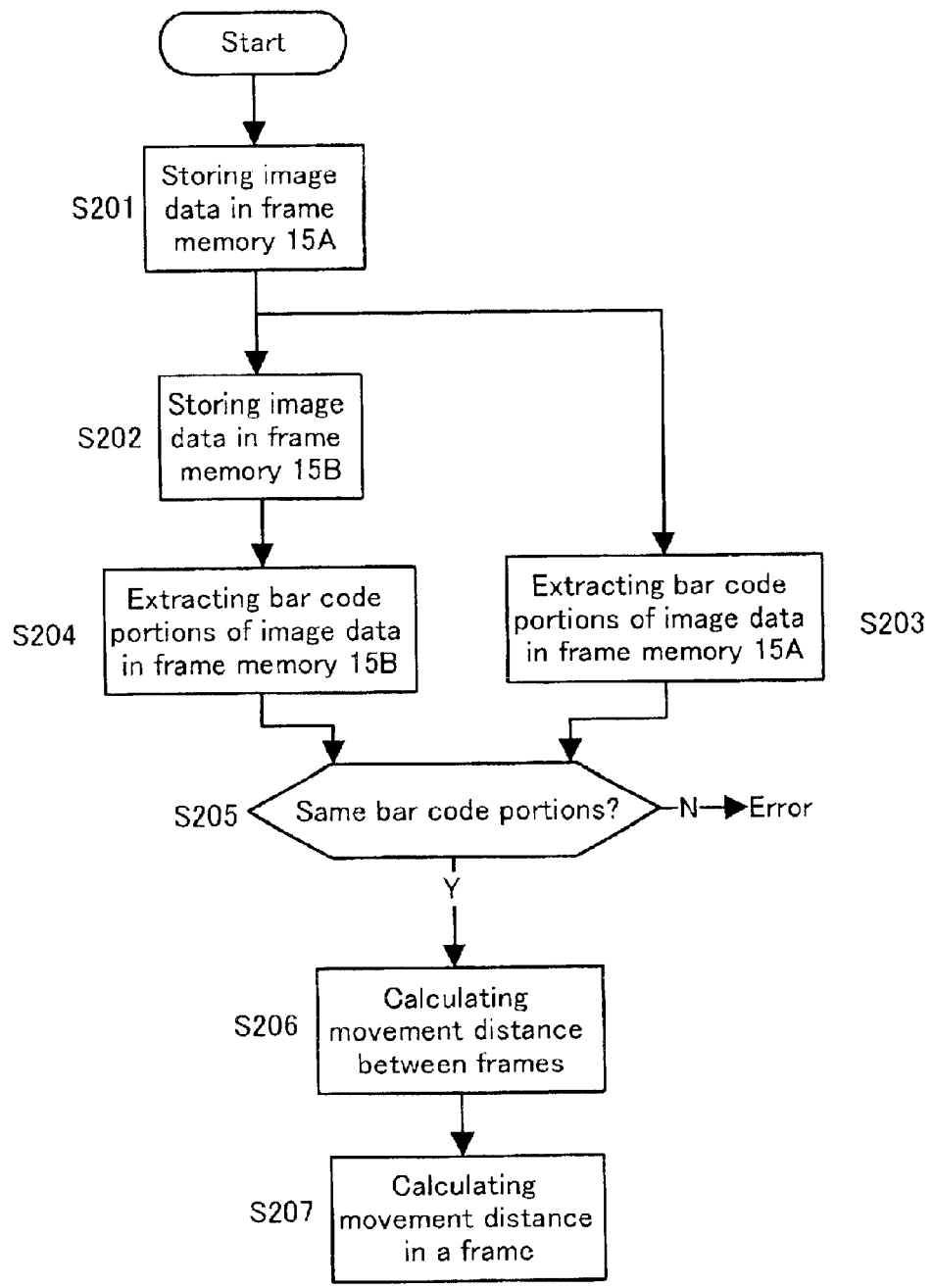
FIG. 11 is a flow chart of the movement distance detection processing.

FIG. 11 is a flow chart of the movement distance detection processing. In FIG. 11, at a specified instant in time, image data that is imaged during a specified exposure time (e.g., 1/600 of a second) is first stored in the frame memory 15A (S201). Then, image data that is imaged after a specified imaging time interval (e.g., 1/60 of a second) has elapsed from the abovementioned specified instant in time is stored in the frame memory 15B (S202).

Then, the bar code portions are extracted by performing the abovementioned bar code portion extraction processing for the image data respectively stored in the frame memories 15A and 15B (S203, S204).

The sets of image data for the two bar code portions thus extracted are compared with each other, and it is confirmed that the image data is the same (S205). In concrete terms, the image data may be viewed as being the same if the correspondence rate is 95% or greater. Furthermore, in cases where the image data is not the same, this constitutes an error.

If it is confirmed that the two extracted bar code portions consist of the same image data, the movement distance between frames is calculated from the coordinates of specified pixels in the respective bar code portions (e.g., the pixels at the ends of the bar code portions) (S206). For example, in a case where the coordinates of the two specified pixels are shifted by 100 pixels in the horizontal direction as shown in FIG. 10B, the movement distance of the bar code during the imaging time interval (called the "movement distance between frames") is also 100 pixels.

Then, the movement distance during the exposure time that is to be determined from the abovementioned movement distance between frames is calculated as follows from the ratio of the exposure time to the imaging time interval (S207):

Movement distance=movement distance between frames×exposure time/imaging time interval From the above equation, for example, the movement distance during the exposure time is determined as 10 pixels in a case where the movement distance between frames is 100 pixels, the exposure time is 1/600 of a second and the imaging time interval is 1/60 of a second.

Returning to FIG. 4, once the movement distance during the exposure time has been detected, it is confirmed that the detected movement distance is shorter than the length of the quiet zones (S12). The reason for this is that it is necessary that at least one pixel image only a white portion (quiet zone) during the specified exposure time. By imaging only a white portion, it is possible to determine a reference value for the restoration of the bar code, i.e., a white output value for a width of one pixel. Furthermore, in cases where the detected movement distances of the respective pixels are longer than the quiet zones, the extraction of the bar code portions is re-performed in step S10 so that the quiet zones are longer than the movement distances.

Once it has been confirmed that the movement distance is shorter than the quiet zones, the white output value for a one-pixel width is determined by dividing the output of the initial pixel (pixel No. 1) in a given scanning line by the movement distance (number of pixels moved) (S13).

Since the movement distance is shorter than the quiet zones, at least pixel No. 1 is a pixel that images only a quiet zone (white portion) as shown in FIG. 2. Since the output value is the same for all pixel width portions of pixel No. 1, the output value $\Delta A1$ of the initial pixel width portion of pixel No. 1 and the output value $\Delta B1$ of the final pixel width portion can be determined as the calculated white output value for a width of one pixel.

For pixels from pixel No. 2 on, the output value $\Delta Bs$ for the final pixel width portion of each pixel No. x is calculated using the abovementioned Equation (2) (S14).

For a specified line of the extracted portion, a check is made in order to ascertain whether or not the combination of $\Delta Bx$ output values of the respective pixels determined in step S14 is a bar code (S15). The question of whether this combination is a bar code or not is determined (for example) by ascertaining whether or not this combination agrees with predetermined bar code parameters.

In cases where the combination is recognized as a bar code, the processing proceeds to the next process such as a bar code information read-out process or "bar code restoration completed" display process, etc. (S16). On the other hand, in cases where the combination is not recognized as a bar code, this is judged to be a recognition error, and (for example) an error display is performed by a display device (S17).

Figure 12A:
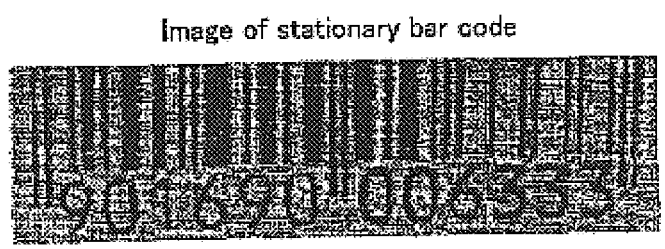
FIGS. 12A, 12B and 12C are diagrams which show an example of a restored bar code image.
Figure 12B:
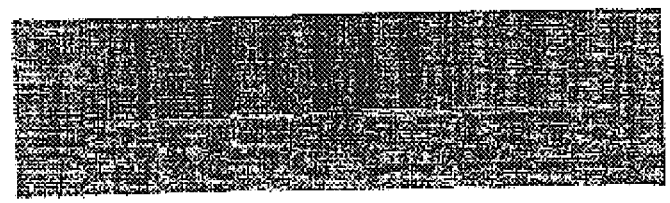
Figure 12C:
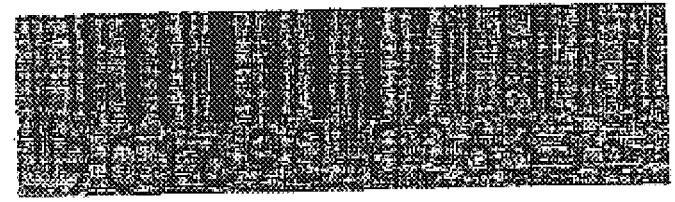

FIGS. 12A, 12B and 12C are diagrams which show an example of a restored bar code image. FIG. 12A shows an example of an image obtained by imaging a stationary bar code. FIG. 12B shows an example of an image of the bar code portions obtained in a case where the bar code has moved 9 pixels during the exposure time; here, the bar code portions are blurred, so that the black and white portions cannot be distinguished. Furthermore, FIG. 12C shows the image obtained by performing the abovementioned restoration processing on the image shown in FIG. 12B; here, an image of the bar code in a stationary state is restored.

Furthermore, in cases where a bar code cannot be recognized, it would also be possible to perform the abovementioned bar code restoration processing on a separate line of the extracted bar code portions before the results are judged to be a recognition error. Furthermore, the abovementioned bar code restoration processing may be performed with the detected movement distance altered within a specified range. Then, in cases where a bar code cannot be recognized even by such processing, an error judgement is made.

In the extraction processing of the bar code portions, the pre-processing described below (hereafter referred to as "scanning line limited processing") may be performed prior to the scanning of the basic lines. Specifically, in this scanning line limited processing, the positions of the bar code portions in the frame memory are estimated to some extent prior to the basic line scanning processing. As a result, the bar code portions can be extracted more quickly by omitting the scanning of lines where it is estimated that no bar code portions are present, and scanning only the lines where it is estimated that bar code portions are present.

Figure 13:
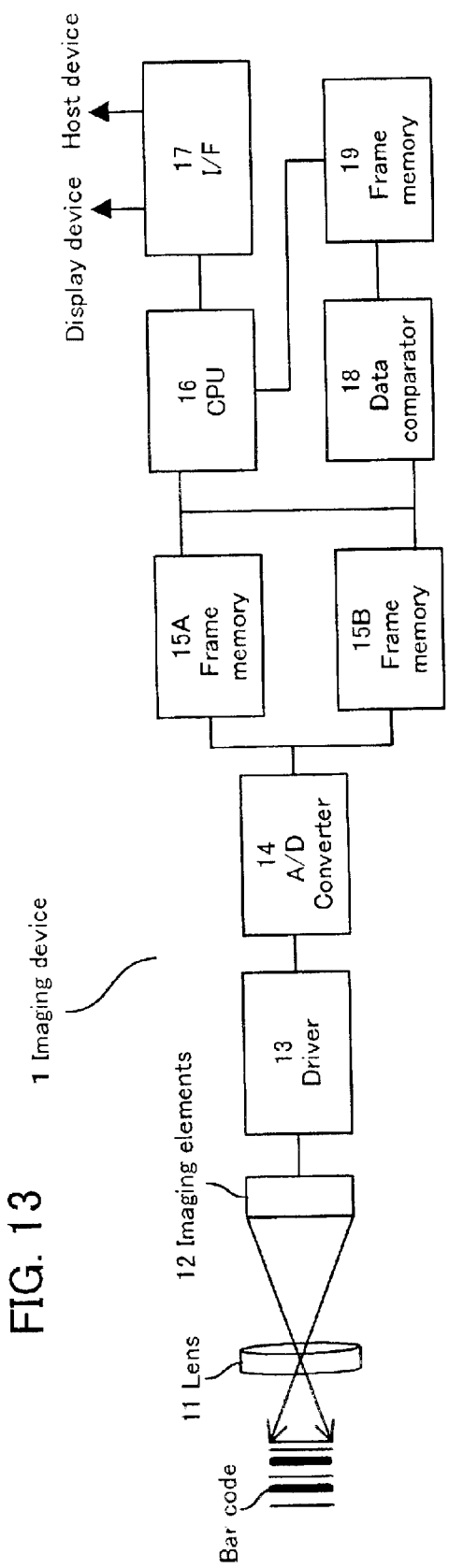
FIG. 13 is a diagram which shows another example of the construction of the imaging device.

FIG. 13 is a diagram which shows another example of the construction of the imaging device for performing scanning line limited processing. Furthermore, in FIG. 13, elements that are the same as in FIG. 1 are labeled with the same reference symbols. An analog image signal from the imaging elements 12 is converted into digital image data consisting of a plurality of bits by an A/D converter 14, and, as in FIG. 1, this image data is alternately stored in frame memories 15A and 15B. A data comparator part 18 compares the image data stored in the frame memory 15A and the image data stored in the frame memory 15B for each set of image data.

Then, the data comparator 18 successively reads out image data of the same coordinates in the respective frame memories 15A and 15B, and ascertains whether or not the difference values between these image data values are greater than a specified threshold value. Then, a flag (1 bit) is added to the read-out data of either the frame memory 15A or frame memory 15B, and this data is stored in another frame memory 19.

In cases where the difference value is less than the threshold value, and flag OFF ("0") is added, while in cases where the difference value is equal to or greater than the threshold value, a flag ON ("1") is added. In cases where the difference value is less than the threshold value, the image data of the frame memories 15A and 15B have substantially the same output values; accordingly, this image data may be judged to be data that corresponds to a non-moving object (background portions). On the other hand, in cases where the difference value is equal to or greater than the threshold value, the output values of the image data of the frame memories 15A and 15B differ; accordingly, this data may be judged to be data that corresponds to a moving object that includes a bar code.

Figure 14A:
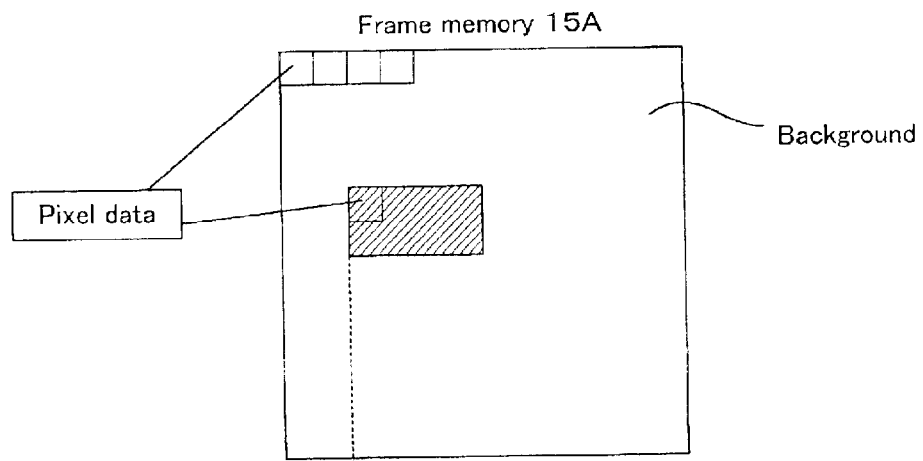
FIGS. 14A, 14B and 14C are diagrams which show model diagrams of the frame memories 15A, 15B and 19.
Figure 14B:
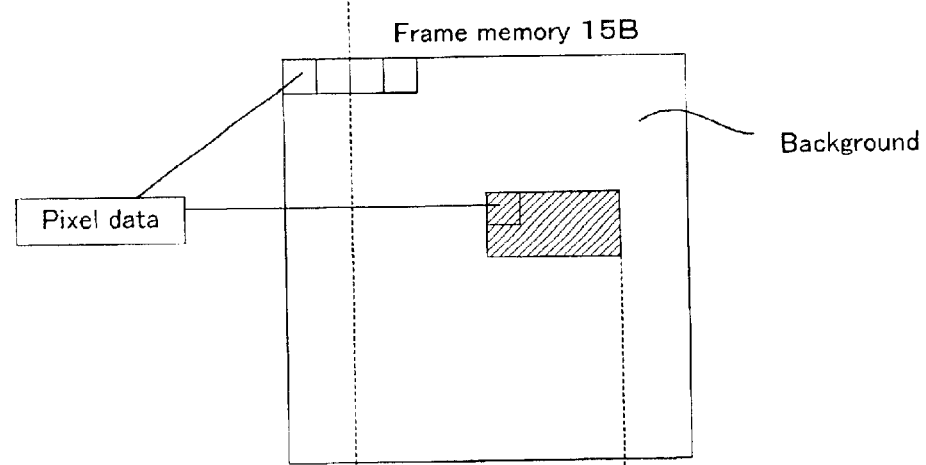
Figure 14C:
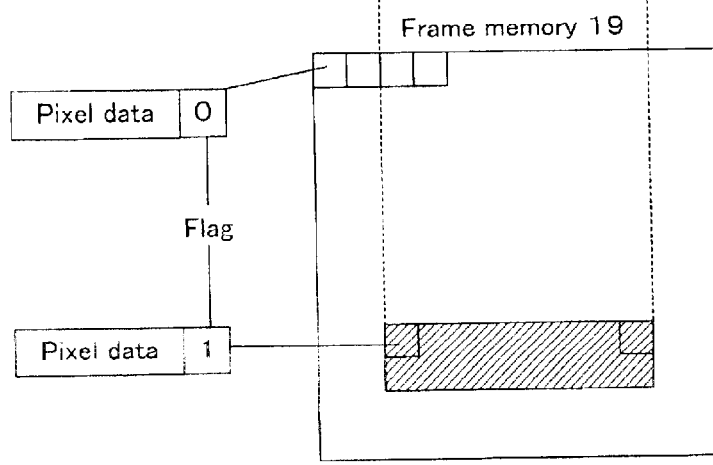

FIGS. 14A, 14B and 14C show model diagrams of the frame memories 15A, 15B and 19. The shaded regions of the frame memories 15A and 15B shown in FIGS. 14A and 14B are image data regions where a moving object with a bar code has been imaged, while the regions other than the shaded regions are background portions (non-moving object). Accordingly, in the frame memory 19 shown in FIG. 14C, the flag of image data corresponding to regions that include both of these (shaded regions) is ON ("1"), while the flag corresponding to image data of other regions is OFF ("0"). Furthermore, the image data that is to be stored in the frame memory 19, i.e., either the image data of the frame memory 15A or the image data of the frame memory 15B, is set beforehand.

As a result, when the frame memory 19 is scanned, the bar code portions in the frame memory can quickly be found by scanning the lines containing image data whose flag is ON.

Figure 15:
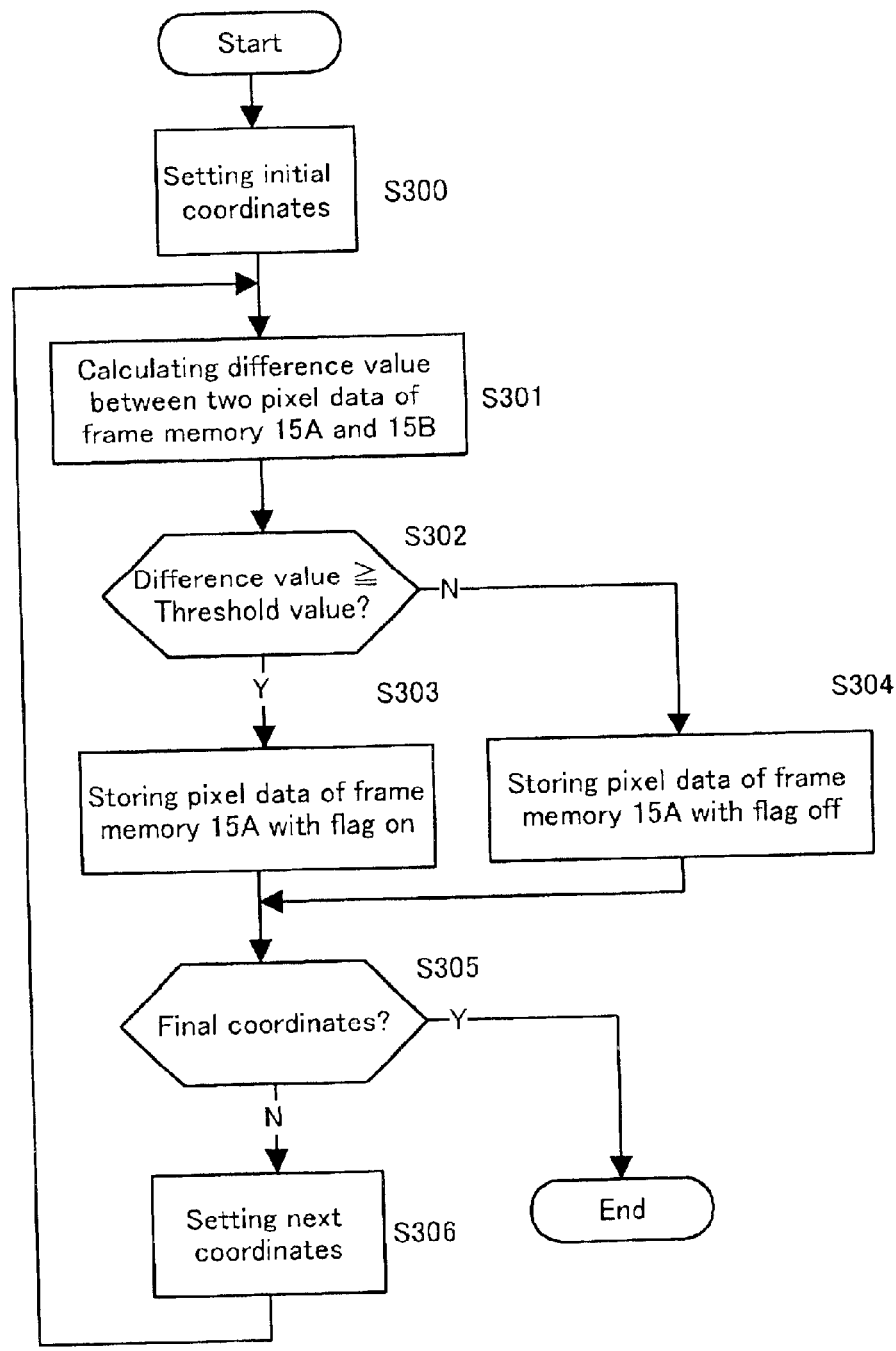
FIG. 15 is a flow chart of the flag judgement processing.

FIG. 15 is a flow chart of the flag judgement processing. In FIG. 15, the data comparator part 18 sets the initial coordinates (e.g., (X1, Y1)) in the frame memory 15A and frame memory 15B (S300). The respective sets of image data corresponding to the set coordinates are read out from the frame memories 15A and 15B, and the difference value between the two sets of data is calculated (S301). In step S302, a flag ON is added in cases where the difference value is equal to or greater than the threshold value, and (for example) the image data from the frame memory 15A is stored in the frame memory 19 (S303). On the other hand, in cases where the difference value is less than the threshold value, a flag OFF is added, and the image data from the frame memory 15B is stored in the frame memory 19 (S304). Then, until the final coordinates are reached (S305), the next coordinates are set (S306), and the abovementioned processing is repeated.

Such processing eliminates the need to calculate the variation in the output value between respective sets of image data in order to ascertain whether or not there are portions that satisfy the abovementioned conditions (A), (B) and (C) for the image data whose flag is OFF ("0") during basic line scanning in the bar code portion extraction processing performed by the CPU 16. As a result, it is sufficient if the CPU 16 calculates whether or not the abovementioned conditions are satisfied only for the image data whose flag is ON. Accordingly, the number of calculations performed by the CPU 16 can be greatly reduced, SO that bar code portions can be found more quickly.

Furthermore, scanning line limited processing may also be performed on the basis of the mage data of a single frame memory 15A (or 15B). In such a case, however, it is necessary that the background brightness be constant. In this processing, the data comparator part 18 compares adjacent image data within the frame memory.

Since the brightness of a non-moving background is constant as required above, respective image data for the background portions have substantially the same output values. Accordingly, the difference values of adjacent image data are calculated, and in cases where the difference values are less than the specified threshold value, a flag OFF is stored in the frame memory 19 together with the image data, while in cases where the difference values are equal to or greater than the threshold value, a flag ON is stored in the frame memory 19 together with the image data. As a result, the number of calculations performed by the CPU 16 can be reduced in the same manner as described above, so that the extraction of the bar code portions can be accomplished more quickly.

In the abovementioned embodiment, a one-dimensional bar code was described as an example; however, the present embodiment can also be applied to a two-dimensional bar code. By imaging a two-dimensional bar code using the imaging device of the present embodiment, it is possible to read out the bar code information of a moving two-dimensional bar code as well.

Furthermore, the object imaged by the imaging device of the abovementioned embodiment is not limited to a bar code; this object may be any desired moving object.

Furthermore, the imaging device of the abovementioned embodiment is not limited to a bar code scanner; this imaging device may also be a device that acquires movie images such as a video camera. In this case, even if the images acquired by the video camera suffer from blurring caused by shaking of the hand-held camera, this blurring caused by shaking of the hand-held camera can be corrected by applying the abovementioned embodiment.

Thus, in the present invention, in cases where a moving object is imaged by imaging elements arranged in two dimensions, a still image of the object can be restored from a motion-blurred image of the object.

Especially in cases where a moving bar code is imaged, even if the image of the bar code is blurred as a result of the movement of the bar code during imaging, a still image of the bar code in which the outlines of the black portions and white portions of the bar code are clear can be obtained. Accordingly, bar code information can be read out from the imaged bar code.

The protected scope of the present invention is not limited to the abovementioned embodiment, but extends to the inventions described in the claims and to equivalent entities.

What is claimed is:

1. An imaging device for imaging an object which is moving in a specified exposure time at specified time intervals using a plurality of imaging elements arranged in two dimensions, comprising:

a first memory for storing a first image;

a second memory for storing a second image that is imaged after the specified time interval from end of imaging of the first image, the first image or the second image being a set of output values of the plurality of the imaging elements;

an extraction unit scanning a plurality of lines within each of said images, and extracting portions including the object from each of said images on the basis of variation patterns of the output values of the imaging elements on each line;

a calculation unit calculating a movement distance of the object, as a number of imaging elements, during the specified time interval on the basis of the difference between a position of the portions including the object in the first image and a position of the portions including the object in the second image, and further calculating the movement distance of the object, as a number of imaging elements, during the specified exposure time in the first image on the basis of the ratio of the specified exposure time to the specified time interval, the movement of the object during the specified exposure time causing a motion blurred image portion of the first image; and a restoration unit restoring the first image without the motion blurred image portion from the first image having the motion blurred image portion caused by the movement of the object during the specified exposure time, on the basis of the movement distance during the specified exposure time and the difference values between the output values of adjacent imaging elements in the first image.

2. An imaging device for imaging an object with a specified exposure time at specified time intervals using a plurality of imaging elements arranged in two dimensions, comprising:

a calculation unit calculating, as the number of imaging elements, the movement distance traveled by the object during the exposure time within an image corresponding to the output values of the plurality of imaging elements;

a restoration unit restoring a still image of the object from portions including the object within the image by using the movement distance and the difference values between the output values of adjacent imaging elements;

a first memory storing a first image;

a second memory storing a second image that is imaged following the first image, wherein said calculation unit calculates the movement distance of the object during the time interval on the basis of the difference between the position of the portions including the object within the first image and the position of the portions including the object within the second image, and further calculates the movement distance of the object during the exposure time within the first image or the second image on the basis of the ratio of the exposure time to the time interval; and an extraction unit scanning a plurality of lines within each of the images, and extracting portions including the object from each of the images on the basis of variation patterns of the output values of the imaging elements on each line, wherein, when the object is a bar code, said extraction unit searches for a variation pattern in a specified line having;

a first portion in which a substantially constant output value corresponding to a white portion continues;

a second portion in which the output value decreases at a variation rate within a specified range, then an increase and decrease in the output value is repeated a number of times with a value that is smaller than the output value corresponding to a white portion and the output value rises at a variation rate within a specified range; and a third portion in which a substantially constant output value corresponding to a white portion again continues, and said extraction unit extracts portions containing the variation pattern as bar code portions.

3. The imaging device according to claim 2, wherein said extraction unit detects a first line which has the variation pattern and a second line which is scanned in the same direction as the first line and which has a variation pattern that agrees with the variation pattern of the first line at a specified correspondence rate or greater; and said extraction unit extracts portions that surround the variation pattern portions of the first line and the variation pattern portions of the second line as bar code portions.

4. The imaging device according to claim 2, wherein said extraction unit extracts the respective bar code portions when a plurality of bar code portions are present in each of the images; and said restoration unit respectively restores still images of the respective bar code portions.

5. The imaging device according to claim 2, wherein the first imaging element, among the plurality of imaging elements that image the object, images only the first portion of the bar code during the exposure time.

6. The imaging device according to claim 5, wherein:

said restoration unit determines an output value for the width of one imaging element in the movement distance by dividing the output value of the first imaging element by the movement distance; and said restoration unit restores still images of the bar code portions by determining an output value for the width of the final imaging element on the basis of the difference between the output value for the width of the first imaging element in the movement distance and the difference values between the output values of the respective imaging elements and the output values of the immediately preceding adjacent imaging elements for the respective imaging elements on a specified line following the first imaging element.

7. An imaging device for imaging an object with a specified exposure time at specified time intervals using a plurality of imaging elements arranged in two dimensions, comprising:

a calculation unit calculating, as the number of imaging elements, the movement distance traveled by the object during the exposure time within an image corresponding to the output values of the plurality of imaging elements;

a restoration unit restoring a still image of the object from portions including the object within the image by using the movement distance and the difference values between the output values of adjacent imaging elements;

a first memory storing a first image;

a second memory storing a second image that is imaged following the first image, wherein said calculation unit calculates the movement distance of the object during the time interval on the basis of the difference between the position of the portions including the object within the first image and the position of the portions including the object within the second image, and further calculates the movement distance of the object during the exposure time within the first image or the second image on the basis of the ratio of the exposure time to the time interval;

an extraction unit scanning a plurality of lines within each of the images, and extracting portions including the object from each of the images on the basis of variation patterns of the output values of the imaging elements on each line;

a comparative unit comparing the outputs of two imaging elements corresponding to each other in the first image and the second image, respectively; and a third memory;

wherein said comparative unit stores the output value of one predetermined imaging element in said third memory with an ON-state flag attached when the difference between the output values of the two imaging elements is equal to or greater than a specified value, and stores the output value of one imaging element in said third memory with an OFF-state flag attached when the difference between the output values of the two imaging elements is less than a specified value; and said extraction unit scans the portions of the output values of the imaging elements whose flag is in an ON state during line scanning.

8. An imaging device for imaging an object with a specified exposure time at specified time intervals using a plurality of imaging elements arranged in two dimensions, comprising:

a calculation unit calculating, as the number of imaging elements, the movement distance traveled by the object during the exposure time within an image corresponding to the output values of the plurality of imaging elements;

a restoration unit restoring a still image of the object from portions including the object within the image by using the movement distance and the difference values between the output values of adjacent imaging elements;

a first memory storing a first image;

a second memory storing a second image that is imaged following the first image, wherein said calculation unit calculates the movement distance of the object during the time interval on the basis of the difference between the position of the portions including the object within the first image and the position of the portions including the object within the second image, and further calculates the movement distance of the object during the exposure time within the first image or the second image on the basis of the ratio of the exposure time to the time interval;

an extraction unit scanning a plurality of lines within each of the images, and extracting portions including the object from each of the images on the basis of variation patterns of the output values of the imaging elements on each line;

a comparative unit comparing the outputs of two imaging elements adjacent to each other in either the first image or the second image; and a third memory;

wherein said comparative unit stores the output value of one predetermined imaging element in said third memory with an ON-state flag attached when the difference between the output values of the two imaging elements is equal to or greater than a specified value, and storing the output value of one imaging element in said third memory with an OFF-state flag attached when the difference between the output values of the two imaging elements is less than a specified value; and said extraction unit scans the portions of the output values of the imaging elements whose flag is in an ON state during line scanning.

9. An imaging processing method for images of moving objects that are imaged with a specified exposure time at specified time intervals by a plurality of imaging elements arranged in two dimensions, comprising:

storing a first image;

storing a second image that is imaged after the specified time interval from end of imaging of the first image, the first image or the second image being a set of output values of the plurality of the imaging elements;

scanning a plurality of lines within each of said images, and extracting portions including the object from each of said images on the basis of variation patterns of the output values of the imaging elements on each line;

calculating a movement distance of the object, as a number of imaging elements, during the specified time interval on the basis of the difference between a position of the portions including the object in the first image and a position of the portions including the object in the second image, and further calculating the movement distance of the object, as a number of imaging elements, during the specified exposure time in the first image on the basis of the ratio of the specified exposure time to the specified time interval, the movement of the object during the specified exposure time causing a motion blurred image portion of the first image; and restoring the first image without the motion blurred image portion from the first image having the motion blurred image portion caused by the movement of the object during the specified exposure time, on the basis of the movement distance during the specified exposure time and the difference values between the output values of adjacent imaging elements in the first image.

* * * * *

UNITED STATES PATENT AND TRADEMARK OFFICE
CERTIFICATE OF CORRECTION

PATENT NO.    : 6,827,268 B2
DATED         : December 7, 2004
INVENTOR(S)   : Mitsuharu Ishii et al.

It is certified that error appears in the above-identified patent and that said Letters Patent is hereby corrected as shown below:

Column 13,
Line 3, replace ";" with -- : --

Column 14,
Line 33, change "ON state" to -- ON-state --

Column 15,
Line 16, change "ON state" to -- ON-state --

Signed and Sealed this

Thirty-first Day of May, 2005

JON W. DUDAS
*Director of the United States Patent and Trademark Office*